US00RE36560E

United States Patent [19]

Svetkoff et al.

[11] E Patent Number: Re. 36,560

[45] Reissued Date of Patent: Feb. 8, 2000

[54] METHOD AND SYSTEM FOR HIGH-SPEED, HIGH-RESOLUTION, 3-D IMAGING OF AN OBJECT AT A VISION STATION

[75] Inventors: Donald J. Svetkoff, Ann Arbor, Mich.; Brian L. Doss, Huntersville, N.C.

[73] Assignee: General Scanning, Inc., Simi Valley, Calif.

[21] Appl. No.: 08/079,504

[22] Filed: Jun. 17, 1993

Related U.S. Patent Documents

Reissue of:

[64] Patent No.: 5,024,529
Issued: Jun. 18, 1991
Appl. No.: 07/150,135
Filed: Jan. 29, 1988

[51] Int. Cl.[7] ..... G01B 11/24

[52] U.S. Cl. ..... 356/376

[58] Field of Search ..... 356/376; 359/305, 359/307

[56] References Cited

U.S. PATENT DOCUMENTS

| | | | |
|---|---|---|---|
| 4,299,491 | 11/1981 | Waters et al. | 356/376 |
| 4,473,750 | 9/1984 | Oshuda et al. | 356/376 |
| 4,534,650 | 8/1985 | Clerget et al. | 356/376 |
| 4,627,734 | 12/1986 | Rioux | 356/376 |
| 4,643,578 | 2/1987 | Stern | 356/376 |
| 4,732,485 | 3/1988 | Morita et al. | 356/376 |
| 4,758,093 | 7/1988 | Stern | 356/376 |
| 4,796,997 | 1/1989 | Svetkoff et al. | 356/376 |
| 4,798,469 | 1/1989 | Burke | 356/376 |

FOREIGN PATENT DOCUMENTS

| | | | |
|---|---|---|---|
| 117102 | 6/1985 | Japan | 356/376 |
| 169822 | 7/1986 | Japan | 359/305 |

*Primary Examiner*—Richard A. Rosenberger
*Attorney, Agent, or Firm*—Brooks & Kushman P.C.

[57] ABSTRACT

A method and system for high-speed, high-resolution, 3-D imaging of an object including an anamorphic magnification and field lens system to deliver the light reflected from the object to a small area position detector having a position-sensing direction. Preferably, an acousto-optic deflector together with associated lens elements scans a beam of modulated laser light across the object to produce a telecentric, flat field scan. The deflector has a feedback loop to enable uniform illumination of the object. The light scattered from the object is collected by a telecentric receiver lens. A combined spatial and polarization filtering plane preferably in the form of a programmable mask is provided to control the polarization and acceptance angles of the collected light. A reduction or focusing lens is positioned immediately behind the filtering plane and is utilized as a telescope objective. The lens system includes a negative cylinder lens having a relatively large focal length and a field lens having a relatively small focal length. The cylinder lens and the reduction lens magnify the image in the position sensing direction of the detector and the field lens delivers the magnified light to the detector. The detector is a photodetector such as a lateral effect photodiode or a rectangular lateral effect detector. A pre-amplifier provides a pair of electrical signals which are utilized by signal processing circuitry to compute the centroid of the light spot.

44 Claims, 2 Drawing Sheets

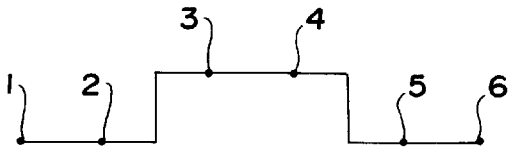
Fig. 2A
Fig. 2B
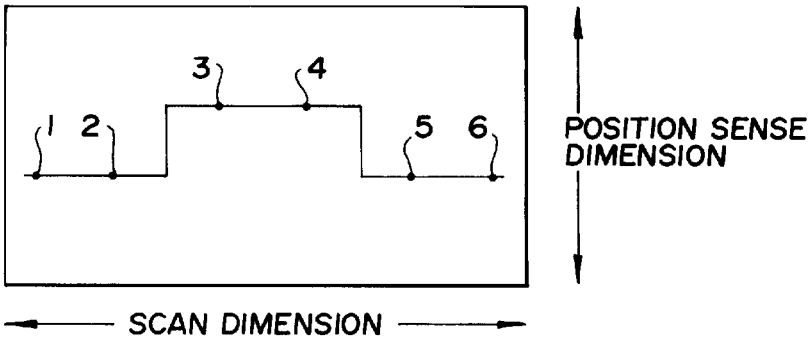
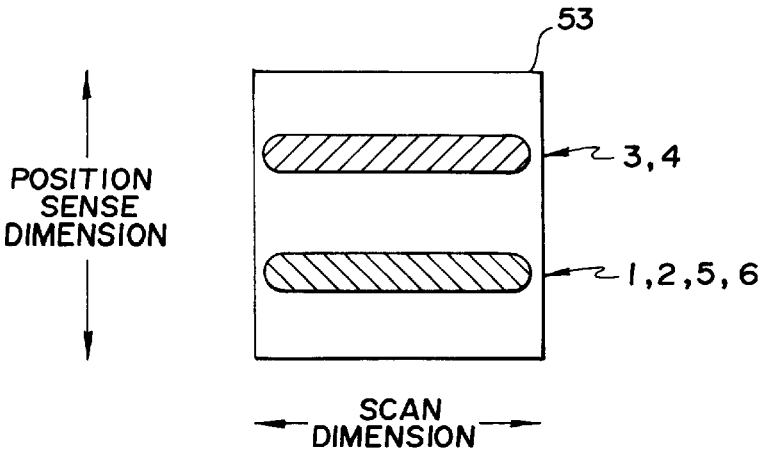
Fig. 2C

METHOD AND SYSTEM FOR HIGH-SPEED, HIGH-RESOLUTION, 3-D IMAGING OF AN OBJECT AT A VISION STATION

Matter enclosed in heavy brackets [ ] appears in the original patent but forms no part of this reissue specification; matter printed in italics indicates the additions made by reissue.

CROSS-REFERENCE TO RELATED APPLICATION

This application is related to U.S. Patent Application entitled "METHOD AND SYSTEM FOR HIGH-SPEED, 3-D IMAGING OF AN OBJECT AT A VISION STATION", U.S. Ser. No. 052,841 filed May 21, 1987 now U.S. Pat. No. 4,796,997 and having the same Assignee as the present application. The entire disclosure of U.S. Ser. No. 052,841 is hereby expressly incorporated by reference.

TECHNICAL FIELD

This invention relates to a method and system for imaging an object at a vision station to develop dimensional information associated with the object and, in particular to a method and system for the high-speed, high resolution imaging of an object at a vision station to develop dimensional information associated with the object by projecting a beam of controlled light at the object.

BACKGROUND ART

A high-speed, high resolution (i.e. approximately 1 mil and finer) 3-D laser scanning system for inspecting miniature objects such as circuit board components, solder, leads and pins, wires, machine tool inserts, etc., can greatly improve the capabilities of machine vision systems. In fact, most problems in vision are 3-D in nature and two-dimensional problems are rarely found.

Several methods have been used to acquire 3-D data: time of flight, phase detection, autofocus, passive stereo, texture gradients, or triangulation. The latter approach is well suited for high resolution imaging and is perhaps the most well known technique.

In the general scanning triangulation method a laser beam is scanned across the object to be inspected with a deflector and the diffusely scattered light is collected and imaged onto a position sensitive detector The scanner can be a rotating polygon, galvanometer, resonant scanner, holographic deflector, or acousto-optic deflector Likewise, the position sensitive detector can be a linear or area array sensor, a lateral effect photodiode, a bi-cell, or an electro-optic position sensing device. Sometimes, a pair of position detectors are used to reduce shadowing. With linear arrays or area cameras there is severe trade off between shadows, light sensitivity and field of view.

For obtaining very high speed and low light sensitivity, the position sensing system described in the above-noted patent application is preferred However, if it is not required to detect very low light levels, lateral effect photodiodes can be used at data rates up to about 1 MHz and are inexpensive, commercially available devices.

Often triangulation-based methods and systems have used the concept of "structural light". As described in U.S. Pat. No. 4,105,925 such a method involves projecting a line or multiple lines onto the surface of the object to be inspected and detecting the displacement of the projected line (or multiple lines) with a video camera. Such systems are now available off-the-shelf and are relatively inexpensive.

The primary disadvantages of such a system are the very low speeds (typically 10,000 points/second) and, in the case of multiple projected lines in a single image, ambiguous interpretations of the data result from overlap of adjacent stripes and multiple scattered light between stripes. Both disadvantages can be overcome by replacing (1) the line projector with a flying spot scanner and (2) the video camera with one of several types of position sensitive detectors, as illustrated in U.S. Pat. No. 4,375,921.

Conventional triangulation by scanners or structured light systems often utilize conventional imaging lenses (i.e., reduction lenses, 35 mm lenses, or cylinder lenses designed for long line detectors) to deliver light to large area position sensitive detectors such as area [sensor] *sensors*, linear arrays or large area position sensitive detectors. The large area detectors have several limitations: low speed due to large detector capacitance, high dark currents, and a much higher noise floor than what is found with small area devices.

For example, a 20 mm×20 mm P-I-N lateral photodiode (equivalent to the approximate arts of a typical 1" video camera tube) has a capacitance of several hundred picofarads and a dark current of several micro-amps. On the other hand, a 2 mm×2 mm device will have capacitance of about 5 pf and a dark current of about 50 nanoamps. Both the speed and noise performance of the smaller detectors can be orders of magnitude better than the performance achievable with large area devices. The improvement in s is directly proportional to the reduction in capacitance and the improvement in signal-to-noise ratio *ratio* is at least as large as the square root of the reduction in capacitance.

With typical triangulation-based images it is difficult to deliver light to a small area device without decreasing the field of view (and consequently the inspection speed). Furthermore, if the field of view is increased the height resolution is necessarily decreased in conventional triangulation based imagers. Also, if a spherical reduction lens is used to deliver light to the detector (with the necessary proportional decrease in resolution) the light gathering capability of the system is reduced in proportion to the area. These are severe limitations and impose undesirable trade-offs which limit the system performance.

A "synchronized scanning" approach can be used to overcome this problem as described in U.S. Pat. No. 4,553,844 to Nakagawa et al. This scanning approach is commonly implemented with polygonal or galvanometer driven mirrors. However, this approach requires that the sensor head contain moving parts in the form of a rotating mirror (for example, in the Fournier plane or telecentric stop) or a pair of mirrors. In effect, a second mirror is used to follow the spot which is scanning by means of the first mirror. These moving parts are often not desirable, particularly if the sensor is to be subjected to the type of acceleration found with x-y tables and robotic arms in industrial environments.

A dilemma exists with conventional triangulation imagers: it is desirable to use a small detector but unless moving parts are included the field of view becomes too small, the resolution too coarse, and the light gathering capability poor. Even if the coarse resolution is tolerable, the loss of light gathering capability also further reduces the system signal-to-noise ratio The signal-to-noise ratio is not good in the first place (particularly at high speeds) because of the use of the large area detector thereby compounding the problem.

Many other prior U.S. [patent] *patents* describe various methods for the acquisition of 3-D data by means of triangulation. For example, the U.S. Pat. No. 4,188,544 to Chasson describes a structured light method in which a beam expander and cylinder lens is used to project a line of light onto an object. The line of light is sensed with an imaging lens and video camera. The position of each point is destined with a peak detection algorithm. The measurement rate is slow due to the readout of the video camera. Multiple lines of light alleviate this problem to some extent.

In the U.S. Pat. No. 4,201,475 to Bodlaj, an object is scanned in a position sensing dimension and the time displacement is detected by a single photodetector having a very narrow field of view. The speed of the system is limited by the retrace time of the scanning device at each measurement point. This method is relatively slow especially for the requirements of small part inspection at quasi-video rates (i.e. MHz).

In the U.S. Pat. No. 4,645,917 to Penny, a swept aperture profiler is described. It too measures a time displacement for determining position. A galvanometer driven mirror is used to scan a line of data (i.e. x, y coordinates). An acousto-optic deflector is used to scan the position sensing dimension and the instant at which the light is received by the photodetection device indicates depth. The use of the A-O deflector for the z dimension scanning represents an improvement over the previous technology. Also, the use of a photomultiplier as a detection device allows for a much improved dynamic range.

The U.S. Pat. No. 4,355,904 to Balusubramanian describes a triangulation-based method which incorporates a position sensing device in the form of a variable density filter together with a system for sweeping the laser beam and controlling the position of the measurement probe. The tolerance on the density of typical variable filters whether fabricated with a metallic coating on glass or with photographic film plate, is typically +5% at any single point.

The U.S. Pat. No. 4,589,773 to Satoshi Ido, et al., describes a position sensing method and system for inspection of wafers which utilizes a commercially available position detector. A reduction lens is used to focus the light into a small spot on the surface of the object with a 10X reduction. A magnification lens is used in the receiver (10X) to deliver light to a detector. The triangulation angle is 45 degrees with the receiver and detector at complementary angles (90 degrees). This is fine for wafer inspection. However, the method is deficient for several other types of inspection tasks because (1) unacceptable shadows and occlusion effects would occur for tall objects; (2) the field of view of the probe is very small; (3) a reduction of the angle to 15 degrees (to reduce shadows) would degrade the height sensitivity significantly; and (4) the detector area is relatively large which limits speed and the signal to noise ratio as the speed of the system is increased.

The U.S. Pat. No. 4,472,056 to Nakagawa et al., describes a method which involves projection of a line of light and the use of a rectangular CCD as the position sensor. This represents a significant improvement in speed over the method described in the above noted U.S. patent to Chasson and is good for inspection of parts with a relatively limited height range (i.e., 16 levels). Logic and hardware is included for peak detection which can be related to the depth of the object.

In the U.S. Pat No. 4,650,333 to Crabb et al., a method of structured light projection is described which is somewhat complementary to the method described in the Nakagawa patent not immediately above. A stripe of light produced with a cylindrical lens is swept across the object with an acousto-optic detector in such a way that a single CCD line array can be used. This is a less expensive way of implementing the structured light method which does not require a custom CCD. Again, the speed and stray light rejection capabilities of the probe are limited which restrict it to depth measurement of objects (like traces) which are not very tall. Nevertheless, the method is suited to the inspection task of trace height measurement.

The U.S. Pat. No. 4,593,967 to Haugen assigned to Honeywell describes a triangulation-based scanning system utilizing a holographic deflection device to reduce the size and weight of the scanning system and a digital mask for detection of position. The digital mask is in the form of binary grey code and requires a detector for each bit (i.e. 8 detectors for an 8 bit code). A single cylinder lens is used in the receiver to convert a spot of light into a thin line which must be sharply focused onto a series of photodetectors. In other words, the spot is converted into a line to deliver the light to the series of long thin detectors. Spatial averaging is not performed in the system nor is the centroid of the light spot determined.

U.S. Pat. No. 4,634,879 discloses the use of optical triangulation for determining the profile of a surface utilizing a prism and two photomultiplier tubes in a flying spot camera system. These are arranged in a "bi-cell" configuration. The [bicell] *bi-cell*, however, does not compute the centroid of the received light spot and is therefore sensitive to the distribution of intensity within the received light spot. As an anti-noise feature, amplitude modulation is impressed upon the laser beam and a filter network is used to filter photomultiplier response so as to exclude response to background optical noise.

DISCLOSURE OF THE INVENTION

An object of the present invention is to provide an improved method and system for high speed, high resolution 3-D imaging of an object at a vision station wherein high speed and sensitivity can be obtained by using a flying spot laser scanner with a light deflector and an optical system to deliver the light reflected from an object to a single, small area position detector such as a photodetector to develop dimensional information associated with the object while substantially reducing ambient and multiple reflected light.

Another object of the present invention is to provide a triangulation-based method and system for imaging an object at a vision station which overcomes many of the limitations of the prior art methods and systems by achieving excellent height resolution at a narrow triangulation angle wherein shadow and occlusion effects are reduced while having a relatively large field of view.

Yet still another object of the present invention is to provide a method and system for high speed imaging of an object at a vision station to develop high resolution, dimensional information associated with the object and having a high signal-to-noise ratio in a relatively inexpensive and compact fashion and which system can be interfaced with standard, high speed apparatus.

In carrying out the above objects and other objects of the present invention, a method is provided for the high-speed, high resolution 3-D imaging of an object at a vision station to develop dimensional information associated with the object. The method includes the steps of scanning a beam of controlled light in a scanning direction at the surface of the object at a first predetermined angle to generate a corresponding reflected light signal, receiving the reflected light signal at a second angle with a set of optical components, including first and second lenses and filtering the received signal with the set of optical components. The method further includes the steps of measuring the amount of radiant energy in the reflected light signal with a small area position detector having a position-sensing direction, producing at least one electrical signal proportional to the measurement, and computing a centroid value for the reflected light signal from the at least one electrical signal. The method is characterized by the steps of delivering the filtered light signal to the small area position detector with an anamorphic magnification and field lens system. The lens system includes a third lens for increasing the filtered light signal in the position-sensing direction of the position detector and a fourth lens having a relatively short focal [lens] *length* for delivering the light signal to the position detector.

Further in carrying out the above objects and other objects of the present invention, an imaging system for the high-speed, high resolution 3-D imaging of an object at a vision station to develop dimensional information associated with the object is provided. The system includes a source for scanning a beam of controlled light in a scanning direction at the surface of the object at a first predetermined angle to generate a corresponding reflected light signal and a set of optical components including first and second lenses for receiving the reflected light signal at a second angle and for filtering the reflected light signal. The system further includes measuring means including a small area position detector having a position sensing direction for measuring the amount of radiant energy in the reflected light signal and producing at least one electrical signal proportional to the measurement. Signal processing means computes a centroid value for the reflected light signal from the at least one electrical signal. An anamorphic magnification and field lens system includes a third lens for increasing the filtered light signal in the position-sensing dimension of the position detector and a fourth lens having a relatively short focal length for delivering the light signal to the position detector.

In one construction of the imaging system, the source preferably includes a solid state (i.e. acousto-optic) laser light deflector and the set of optical components preferably includes a mask to control the polarization and acceptance angles of the collected light.

Also, preferably, the measuring means includes a highly sensitive photodetector such as a lateral effect photodiode for converting the radiant energy into at least one electrical current.

Still, preferably, the field of view of the filtered light signal is translated across the position detector by translation means to expand the range of dimensional information associated with the object.

The advantages accruing to the method and system as described above are numerous. For example, such an imaging system can be incorporated into an inspection/gauging product wherein both range and intensity data are acquired.

Also, such a method and system provide high resolution, quasi-video rate, full 3-D imaging at a relatively low cost. A long scan line (i.e. field of view) is achieved as well as a high signal-to-noise ratio, height sensitivity and light gathering capability and low capacitance and "dark current".

The present invention overcomes many of the problems of the prior art by utilizing an anamorphic magnification and field lens system to deliver light to small area position sensor in conjunction with the benefits of utilizing an all solid state light deflection system (i.e. compact, rugged, easy to interface with, etc.)

The objects, features and advantages of the present invention are readily apparent from the following detailed description of the best mode for carrying out the invention when taken in connection with the accompanying drawings.

Figure 1:
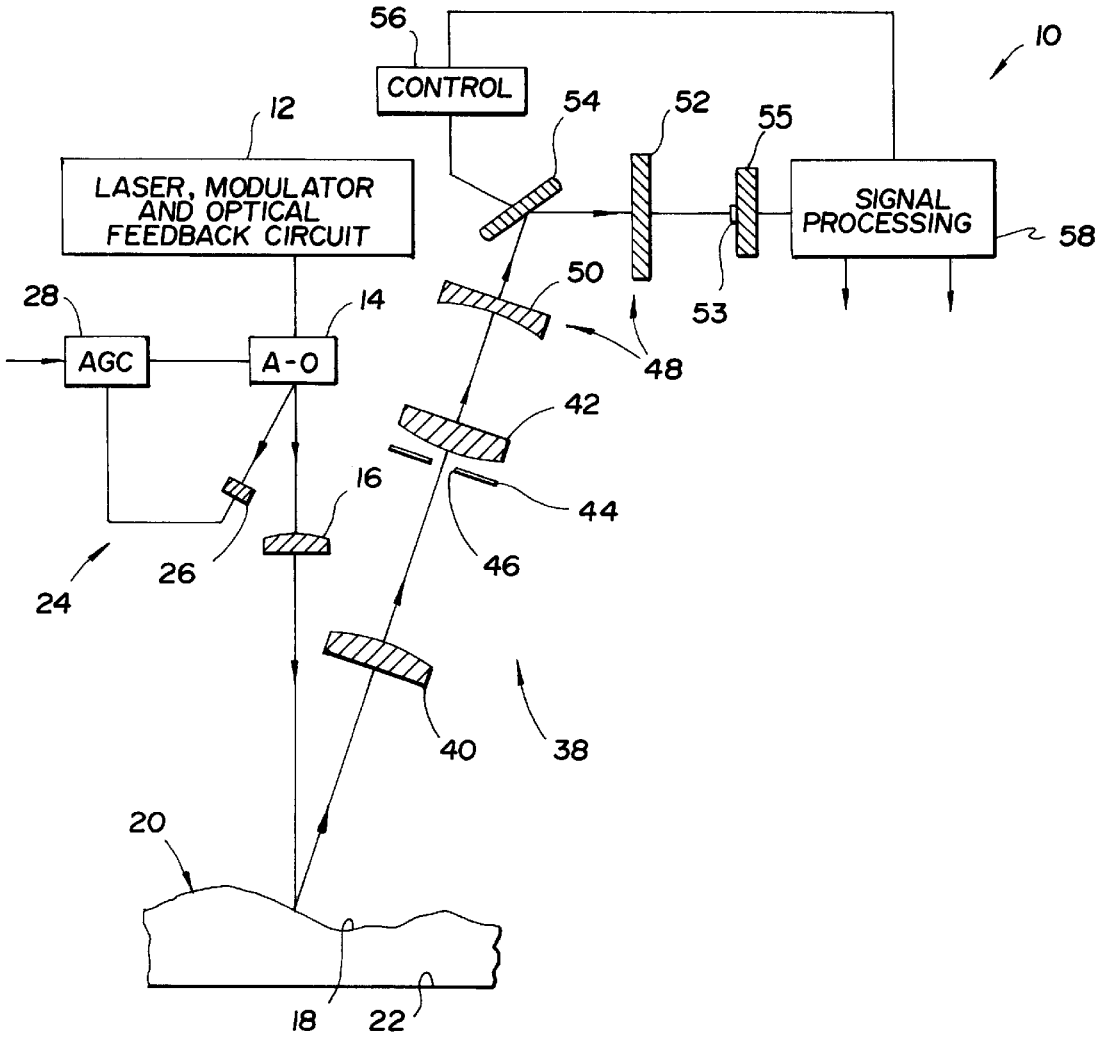
FIG. 1 is a schematic view illustrating the 3-D method and system of the present invention.

FIG. [2is] *2 is* a profile of an object at a vision station having a step profile wherein several positions of the object are labelled;

FIG. 2*b* is an illustration of the positions of FIG. 2*a* on a large a detector as a laser spot is scanned from corresponding positions along the object; and FIG. 2*c* is an illustration similar to the illustration of FIG. 2*b* except the method and system of the present invention are utilized to effect the delivery of the reflected light and spot shape to a small area photodetector.

BEST MODE FOR CARRYING OUT THE INVENTION

Referring now to FIG. 1, there are illustrated the major components of a 3-D imaging system constructed in accordance with the present invention and generally indicated at 10. The system 10 is positioned at a vision station and includes a controlled source of light such as a laser, modulator and optical feedback circuit 12. A scanner in the form of an acousto-optic deflector 14 and beam shaping and focusing optics in the form of various lens elements 16 produce a telecentric, flat field scan by projecting a series of laser beams at the reflective surface 18 of an object, generally indicated at 20. The object is supported on a reference, planar surface 22 at the vision station.

Within the block 12 a laser is coupled to a modulator to shift the information to a higher frequency where system noise characteristics are better. The modulator may perform one of many types of modulation, including sine wave, pulse amplitude, pulse position, etc. Preferably, the laser is a solid state laser diode and is "shuttered" with a TTL signal (i.e. TTL modulation). In this way, the laser signal is encoded so as to allow separate signal processing functions to be performed during "on" and "off" intervals as described in detail in the above-noted application. Typically, power levels are 20–30 mW (Class III-B) which are well suited for machine vision applications.

A solid state acousto-optic (i.e. A-O) deflector 14, such as one commercially available from Newport Electro-Optics, is preferably used. The deflector is easy to interface with, is very rugged and compact. This presents numerous advantages. The size of the system 10 can be about the size of a video camera. No moving parts are present in the system 10. Long term stability is easy to maintain. The system 10 can be made rugged enough to mount on a translator like an x-y table or robotic arm with relatively little effort. Therefore, producing the unit in large quantities is relatively easy. Most A-0 deflectors produce about 500 spots/scan line which provides a very convenient interlace to digitizers and image processing equipment. The duty cycle is also very high compared to other types of scanners (95% vs. 50%).

The A-O deflector 14 has the advantage of being all solid state as previously discussed. However, due to the nature of diffractive scanning, a smooth illumination gradient of about 10–30% of the average value in the field of view results. Although this type of gradient can sometimes be tolerated, it is undesirable because it offsets a potentially large advantage of laser scanning in general: the ability to deliver the same quantity of light at the same angle of incidence to every point in the field of view.

An optical and electronic feedback loop generally indicated at 24, is utilize to correct this slowly varying gradient (i.e. for flat field correction). The A-O deflector 14 produces both a scanning beam and a "DC" beam which is normally blocked with a spatial filter. This DC beam will contain about 30% of the laser power. By sensing the variations in this beam it is possible to infer the variations in the illumination because the total light is the sum of the [.canning] *scanning* (i.e. 1st order) light and the DC beam (0th order).

The DC beam is sensed by a photodetector 26 of the loop 24. The resulting electrical signal is used by an automatic gain control circuit 28 (i.e., including an amplifier and an integrator) of the loop 24 to attenuate or amplify the RF power applied to the A-O deflector 14 at a balanced mixer. The resulting intensity distribution is flat to about 1% which provides a significant advantage for greyscale inspection and a modest dynamic range improvement for 3-D inspection.

There is generally indicated at 38 an optical system for use in optically processing the light signal reflected from the object 20. The optical system 38 includes a set of optical components, including a telecentric receiver lens 40 to collect scattered light from the object 20 at a position approximately one focal length from the object 20. A reduction focusing lens 42 operates as a telescope objective. The lenses 40 and 42 operates as a preferred conjugate. The reduction lens 42 can be interchanged to accommodate various reduction and magnification ratios. The reduction lens 42 is placed directly behind a mask 44.

The mask 44 is located at one focal length from the receiver lens 40 and functions as a telecentric stop to provide a spatial and polarization filtering plane. In one embodiment, the mask forms a rectangular aperture (i.e. spatial filter) positioned at the intermediate spatial filtering plane to reject background noise (i.e. stray light) which arises from secondary reflections from objects outside of the desired instantaneous field of view of the system 10. The mask 44 may be a fixed aperture 46 or electromechanical shutter, or, preferably, is a liquid crystal, binary, spatial light modulator or valve which is dynamically reconfigured under software control. Such a configuration is useful for inspection of very shiny objects (reflowed solder, wire bond, loops, pin grids, etc.) which are in close proximity from which multiple reflections will be created. Consequently, both the angle (through stop size) and polarization of the input light can be digitally controlled prior to delivery to a detector.

If desired, the spatial filter or strip can be programmed in a chosen pattern of opaque and transmissive patterns correlated with the height profile of the object to be detected. For example, a height measurement of shiny pins placed on a shiny background will be more reliable if only a narrow strip corresponding to the height range over which properly positioned pins is viewed. Multiple reflections may produce a signal return which is significantly larger than the return produced by useful light. If properly placed, the position of the pin will be reported If defective, no pin will be found.

When a conventional triangulation-based scanner is used (i.e. a solid state device having no moving parts but an area detector) the aperture 46 of the mask 44 is no larger than necessary for detection of a specified height range, but is still preferably programmable.

The optical system 38 further includes an anamorphic magnification and field lens system, generally indicated at 48. The lens systems 48 includes a pair of anamorphic elements or lenses 50 and 52. The lens 50 is a very long focal length, precision negative cylinder lens to magnify the image in the position-sensing direction. The focal length of the lens 50 is typically between about −300 mm and −1000 mm and may have a focal length in the range of −200 to −1200 mm.

The lens 52 is a custom short focal length cylinder lens having a speed of about f/0.5 or f/0.6 and may have a speed in the range of f/0.4 to f/0.7 which is used to expand the field of view and light gathering capability of the system 38. The lens 52 has a preferred focal length of about 25 mm and may have a focal length in the range of 20 to 30 mm.

FIG. 2*a* illustrates the profile of a "step object" wherein several positions on the stop object are labelled.

FIG. 2*b* illustrates the labelled positions of FIG. 2*a* as seen in a large area detector as a laser spot is scanned along the object. This represents the prior art.

FIG. 2*c* shows the same labelled positions of FIG. 2*a,* and also shows the effect of using the pair of lenses 50 and 52. The lenses 50 and 52 convert a small focused spot of light into a smooth, enlarged rectangular or elliptical spot which uniformly illuminates an extended region of a single position sensitive detector 53 and averages spatial noise resulting from variations in sensitivity from point to point.

The combination of the lenses 42 and 50 serve to provide magnification in the position sensing dimension. The magnification in the position sensing direction is usually greater than 1:1, thereby yielding microscopic magnification.

The lens 52 serves as an anamorphic field lens into which the scan line is imaged. The length of the imaged scan line can be almost as large as the lens 52 (i.e. −40 mm) but is clearly much larger than the dimension of the detector 53. Hence, it serves as the reduction optic. The lens 52 can be fabricated in the form of a double convex singlet, a plane convex "hemi-cylinder" or with a gradient index optic having a radial gradient or a combination thereof. A double convex design, however, is preferable.

In order to extend the depth measurement range of the system 10, a translating tracking mirror 54 is included and can be placed at any of several convenient positions provided it is behind the mask 44 to maintain telecentricity. Alternatively, a small angle deflector can be used but will deviate rather than translate the light beam.

The translating mirror 54 is mounted on a precision miniature translation stage which is displaced under software control via a control or controller 56 which, in turn, is coupled to a signal processing circuit 58.

The mirror 54 is useful because it can significantly extend the measurement range of the system 10. For example, the position sensor or detector at any instant can discriminate about 256 levels or height. Several inspection tasks may demand in extension of this height range. For example, it may be desirable to measure the height of solder on pads which requires depth sensitivity of about 0.0004 inch. On the other hand, it may be desirable also to measure the position and geometry of component leads which are to be aligned with the pads. The leads may extend upward about 0.25" or more to the body of the component. This exceeds the linear measurement range of lateral photodiodes. Also, wire loops are very thin and require high spatial and depth resolution for an accurate measurement. However, these wires may also extend up to 0.25" and a sensor which is to accommodate this entire range at the required 0.0002" inch height and spatial resolution is not practical.

The translating mirror 54 alleviates this problem. The only requirement is that the lens 40 receive the light. The lens 40 can be expected to provide an image size (in the position sensing dimension) which is somewhat larger than the detector 53. Displacing the mirror 54 has the effect of translating the total field of view (constrained by the lens 40) across the detector 53 so that many more levels of height can be sensed while still utilizing the small area detector 53.

Preferably, a single detector element is utilized as a small area position sensitive detector 53 of the system 10. The system 10 can obtain quite accurate z (i.e. height) measurements with a lateral effect photodiode (LEP), the internal resistance of which provides the depth sensing and centroid computation capability through attenuation of signal currents. The position detector 53 is preferably a lateral effect photodiode like the Si-Tek 2L2 or 2L4 or a special rectangular lateral effect detector. These position sensitive devices have substantial speed and depth range advantages over linear arrays. Bi-cells or digital masks (i.e. optical encoder) are not preferred.

The detector 53 is coupled to a pre-amplifier 58 which, in turn, is coupled to the signal processing circuit 58 which computes the centroid of the light spot thereby allowing for non-uniform and directional intensity distributions.

The signal processing circuit or unit 58 expands/compresses the variable data in order to obtain the proper Z value, grey scale information and special values indicating incorrect height information. The signal processing circuit 58 is described in greater detail in the above-noted application.

Although the system 10 is designed to support a scanning mechanism with no moving parts, it can also be used in the synchronized scanning geometry approach to provide additional benefits, namely increasing resolution using a very small point detector and spatial averaging over the detector.

The above-described imaging method and system present numerous advantages. For example, imaging can be performed at high resolution and at quasi-video rates to obtain full 3-D information. A large scan line (i.e. field of view) is achieved as well as a high signal-to-noise ratio, height sensitivity and light gathering capability and low capacitance and "dark current". Also, such a method and system offer the potential of accurate, quasi-video frame rate depth sensing at low cost.

While the best mode for carrying out the invention has herein been described in detail, those familiar with the art to which this invention relates will recognize various alternative designs and embodiments for carrying out the invention as defined by the following claims.

What is claimed is:

1. A method for the high-speed, high-resolution, 3-D imaging of an object at a vision station to develop dimensional information associated with the object, the method including the steps of: scanning a beam of controlled light in a scanning direction at the surface of the object at a first predetermined angle to generate a corresponding reflected light signal; receiving said reflected light signal at a second angle with a set of optical components for creating a relatively small focused spot of light from the reflected light signal, the set of optical components including first and second lenses; filtering the received light signal with the set of optical components; measuring the amount of radiant energy in the reflected light signal with a small area position detector having a detector area and having a position-sensing direction substantially orthogonal to the scanning direction and producing at least one electrical signal proportional to the measurement; and computing a centroid value for the reflected light signal from the at least one electrical signal; wherein the improvement comprises:

converting the focused spot of light into an enlarged, elongated spot of light and imaging the filtered light signal to the small area position detector with an anamorphic magnification and field lens system, including a third lens for magnifying the focused spot of light in the position-sensing direction of the position detector and a fourth lens having a relatively short focal length for reducing the focused spot of light in the scanning direction to form the elongated spot of light, wherein the position detector comprises a single detector element including the detector area of less than 20 $mm^2$ and having a relatively small capacitance and dark current and wherein the entire elongated spot of light is uniformly imaged to a discrete extended region of the detector area, to obtain a relatively high signal to noise ratio, the extended region being elongated in a scan dimension substantially orthogonal to the position-sensing direction, wherein spatial noise resulting from variations in sensitivity from point to point in the detector area are averaged.

2. An imaging system for the high speed, high-resolution 3-D imaging of an object at a vision station to develop dimensional information associated with the object, the system including: a source for scanning a beam of controlled light in a scanning direction at the surface of the object at a first predetermined angle to generate a corresponding reflected light signal; a first set of optical components for creating a relatively small focused spot of light from the reflected light signal, the set of optical components including first and second lenses for receiving the reflected light signal at a second angle and for filtering the received light signal; measuring means, including a small area position detector having a detector area and having a position-sensing direction substantially orthogonal to the scanning direction for measuring the amount of radiant energy in the reflected light signal and producing at least one electrical signal proportional to the measurement; and signal processing means for computing a centroid value for the reflected light signal from the at least one electrical signal, wherein the improvement comprises:

an anamorphic magnification and field lens system for converting the focused spot of light into an enlarged elongated spot of light, the lens system including a third lens for magnifying the focused spot of light in the position-sensing direction of the position detector and a fourth lens having a relatively short focal length for reducing the focused spot of light in the scanning direction to form the elongated spot of light, wherein a position detector comprises a single detector element including the detector area of less than 20 $mm^2$ and having a relatively small capacitance and dark current and the lens system uniformly imaging the entire elongated spot of light to a discrete extended region of the detector area, to obtain a relatively high signal to noise ratio, the extended region being elongated in a scan dimension substantially orthogonal to the position-sensing direction, wherein spatial noise resulting from variations in sensitivity from point to point in the detector area are averaged.

3. The invention as claimed in claim 2 wherein the second and third lens cooperate to magnify the filtered light signal in the position-sensing direction of the position detector.

4. The invention as claimed in claim 1 or claim 2 wherein the fourth lens has a focal length in the range of 20 to 30 mm.

5. The invention as claimed in claim 4 wherein the fourth lens has a speed in the range of f/0.4 to f/0.7.

6. The invention as claimed in claim 5 wherein the fourth lens is a double convex field lens.

7. The invention as claimed in claim 4 wherein the third lens is a negative cylinder lens having a focal length in the range of 200 to 1,200 mm.

8. The invention as claimed in claim 1 or claim 2 wherein the set of optical components includes a programmable mask correlated to a height profile of the object for filtering the received light signal.

9. The invention as claimed in claim 8 wherein the first lens has a first focal length and wherein the first lens is adapted to be located a distance approximately equal to the first focal length from the object.

10. The invention as claimed in claim 9 wherein the mask is located a distance from the first lens approximately equal to the first focal length.

11. The invention as claimed in claim 1 or claim 2 wherein the set of optical components includes a mask having a fixed aperture for filtering the received light signal.

12. The invention as claimed in claim 1 or claim 2 wherein the position detector includes a single photodetector to measure the amount of radiant energy in the reflected light signal to thereby convert the radiant energy into an electrical current.

13. The invention as claimed in claim 12 wherein the photodetector is a semiconductor device [having a detector area of less than 1 $cm^2$].

14. The invention as claimed in claim 12 wherein the photodetector has a detector area of less than 0.1 $cm^2$.

15. A method for the high-speed, high-resolution, 3-D imaging of a relatively small object at a vision station to develop dimensional information associated with the object, the method including the steps of: scanning a beam of controlled modulated light in a scanning direction at the surface of the object at a first predetermined angle to generate a corresponding reflected light signal; receiving said reflected light signal at a second angle with a set of optical components for creating a relatively small focused spot of light from the reflected light signal, the set of optical components including first and second lenses, filtering the received light signal with the set of optical components; measuring the amount of radiant energy in the reflected light signal with a small area position detector having a detector area and having a position-sensing direction substantially orthogonal to the scanning direction and producing at least one electrical signal proportional to the measurement; demodulating the at least one electrical signal; and computing a centroid value for the reflected light signal from the at least one demodulated signal; wherein the improvement comprises:

converting the focused spot of light into an enlarged, elongated spot of light and imaging the filtered light signal to the position detector with an anamorphic magnification and field lens system, including a third lens for magnifying the focused spot of light in the position-sensing direction of the position detector and a fourth lens having a relatively short focal length for reducing the focused spot of light in the scanning direction to form the elongated spot of light, wherein the position detector comprises a single detector element including the detector area of less than 20 $mm^2$ and having a relatively small capacitance and dark current and wherein the entire elongated spot of light is uniformly imaged to a discrete extended region of the detector area, to obtain a relatively high signal to noise ratio, the extended region being elongated in a scan dimension substantially orthogonal to the position-sensing direction, wherein spatial noise resulting from variations in sensitivity from point to point in the detector area are averaged.

16. The invention as claimed in claim 1 or claim 15 or claim 2 wherein the beam of controlled light is a laser scanning beam.

17. The invention as claimed in claim 16 wherein the laser scanning beam is provided by an acousto-optic deflector.

18. The invention as claimed in claim 17 wherein the light deflector further provides a D.C. beam, the amount of radiant energy in the D.C. beam being measured to produce a control signal proportional to the measurement, the control signal being utilized to control the light deflector so that the light deflector illuminates the object in a substantially uniform fashion.

19. The invention as claimed in claim 1 or claim 15 or claim 2 wherein the field of view of the filtered light signal is translated across the position detector by translation means to expand the range of dimensional information associated with the object.

20. The invention as claimed in claim 19 wherein the translation means includes a tracking mirror for reflecting the filtered light signal and a controller for controlling movement of the tracking mirror.

21. An imaging system for the high-speed, high-resolution 3-D imaging of a small object at a vision station to develop dimensional information associated with the object, the system comprising: a flying spot laser scanner including a light deflector scanning a beam of controlled light in a scanning direction at the surface of the object at a first predetermined triangulation angle of less than 20 degrees to generate a corresponding reflect light signal; a first set of optical components for creating a relatively small focused spot of light from the reflected light signal, the first set of optical components including first and second lenses for receiving the reflected light signal at a second angle and for filtering the received light signal; measuring means, including a single, small area position detector having a detector area and having a position-sensing direction substantially orthogonal to the sensing direction for measuring the amount of radiant energy int he reflected light signal and producing at least one electrical signal proportional to the measurement; signal processing means for computing a centroid value for the reflected light signal from the at least one electrical signal; and an anamorphic magnification and field lens system for converting the focused spot of light into an enlarged elongated spot of light, the lens system including a third lens for magnifying the focused spot of light in the position-sensing direction of the position detector and a fourth lens having a relatively short focal length for reducing the focused spot of light in the scanning direction to form the elongated spot of light, wherein the position detector comprises a single detector element including the detector are of less than 20 $mm^2$ and having a relatively small capacitance and dark current, the lens system uniformly imaging the entire elongated spot of light to a discrete extended region of the detector area, to obtain a relatively high signal to noise ratio, the extended region being elongated in a scan dimension substantially orthogonal to the position-sensing direction, wherein spatial noise resulting from variations in sensitivity from point to point in the detector area are averaged.

*22. A method for the high-speed, high-resolution, 3-D imaging of an object (20) at a vision station to develop dimensional information associated with the object, the method including the steps of: scanning a beam of controlled light in a scanning direction at the surface (18) of the object at a first predetermined angle to generate a corresponding reflected light signal; receiving said reflected light signal at a second angle with a set of optical components for creating a relatively small focused spot of light from the reflected light signal, the set of optical components including first and second lenses (40 and 42); filtering the received light signal*

*with the set of optical components; measuring the amount of radiant energy in the reflected light signal with a small area position detector (53) having a detector area and having a position-sensing direction substantially orthogonal to the scanning direction and producing at least one electrical signal proportional to the measurement; and computing a centroid value for the reflected light signal from the at least one electrical signal wherein the improvement comprises:*

*converting the focused spot of light into an enlarged, elongated spot of light and imaging the filtered light signal to the small area position detector with an anamorphic magnification and field lens system (48), including a third lens (50) for magnifying the focused spot of light in the position-sensing direction of the position detector and a fourth lens (52) having a relatively short focal length for reducing the focused spot of light in the scanning direction to form the elongated spot of light, wherein the position detector comprises a single detector element including the detector area of less than 1 $cm^2$ and having a low capacitance and dark current and wherein the entire elongated spot of light is uniformly imaged to a discrete extended region of the detector area to obtain a relatively high signal to noise ratio, the extended region being elongated in a scan dimension substantially orthogonal to the position-sensing direction wherein spatial noise resulting from variations in sensitivity from point to point in the detector area are averaged.*

*23. The method of claim 22 wherein the beam of controlled light is modulated and wherein the method includes the step of demodulating the at least one electrical signal and wherein the centroid value is computed from the at least one demodulated signal.*

*24. An imaging system (10) for the high-speed, high-resolution 3-D imaging of an object (20) at a vision station to develop dimensional information associated with the object, the system including: a source for scanning a beam of controlled light in a scanning direction at the surface (18) of the object at a first predetermined angle to generate a corresponding reflected light signal; a first set of optical components for creating a relatively small focused spot of light from the reflected light signal, the set of optical components including first and second lenses (40 and 42) for receiving the reflected light signal at a second angle and for filtering the received light signal; measuring means, including a small area position detector (53) having a detector area and having a position-sensing direction substantially orthogonal to the scanning direction for measuring the amount of radiant energy in the reflected light signal and producing at least one electrical signal proportional to the measurement; and signal processing means (58) for computing a centroid value for the reflected light signal from the at least one electrical signal, wherein the improvement comprises:*

*an anamorphic magnification and field lens system (48) for converting the focused spot of light into an elongated spot of light, the lens system including a third lens (50) for magnifying the focused spot of light in the position-sensing direction of the position detector and a fourth lens (52) having a relatively short focal length for reducing the focused spot of light in the scanning direction to form the elongated spot of light, wherein the position detector comprises a single detector element including the detector area of less than 1 $cm^2$ and having a relatively small capacitance and dark current and the lens system uniformly imaging the entire elongated spot of light to a discrete extended region of the detector area to obtain a relatively high signal to noise ratio, the extended region being elongated in a scan dimension substantially orthogonal to the position sensing direction, wherein spatial noise resulting from variations in sensitivity from point to point in the detector area are averaged.*

*25. The imaging system of claim 24 wherein the source is a flying spot laser scanner including a light deflector (14) for scanning the beam of controlled light in the scanning direction at the surface of the object at a first predetermined triangulation angle to generate the corresponding reflected light signal.*

*26. The imaging system of claim 24 wherein the first predetermined triangulation angle is less than 20 degrees.*

*27. The invention as claimed in claim 22 or claim 24 wherein the fourth lens has a focal length in the range of 20 to 30 mm.*

*28. The invention as claimed in claim 27 wherein the fourth lens has a speed in the range of f/0.5 to f/0.7.*

*29. The invention as claimed in claim 27 wherein the third lens is a negative cylinder lens having a long focal length.*

*30. The invention as claimed in claim 29 wherein the third lens has a focal length in the range of −300 to −1,000 mm.*

*31. The invention as claimed in claim 27 wherein the fourth lens is a double convex field lens.*

*32. The invention as claimed in claim 27 wherein the second and third lens cooperate to magnify the received light signal in the position-sensing direction of the position detector.*

*33. The invention as claimed in claim 22 or claim 24 wherein the set of optical components includes a programmable mask (44) correlated to a height profile of the object for filtering the received light signal.*

*34. The invention as claimed in claim 31 wherein the first lens has a first focal length and wherein the first lens is adapted to be located a distance approximately equal to the first focal length from the object.*

*35. The invention as claimed in claim 34 wherein the mask is located a distance from the first lens approximately equal to the first focal length.*

*36. The invention as claimed in claim 22 or claim 24 wherein the set of optical components includes a mask (44) having a fixed aperture (46) for filtering the received light signal.*

*37. The invention as claimed in claim 22 or claim 24 wherein the detector area is less than 20 $mm^2$.*

*38. The invention as claimed in claim 22 or claim 23 or claim 24 wherein the beam of controlled light is a laser scanning beam.*

*39. The invention as claimed in claim 38 wherein the laser scanning beam is provided by an acousto-optic deflector (14).*

*40. The invention as claimed in claim 39 wherein the light deflector further provides a D.C. beam being measured to produce a control signal proportional to the measurement, the control signal being utilized to control the light deflector so that the light deflector illuminates the object in a substantially uniform fashion.*

*41. The invention as claimed in claim 22 or claim 23 or claim 24 wherein the field of view of the received light signal is translated across the position detector by translation means to expand the range of dimensional information associated with the object.*

*42. The invention as claimed in claim 39 wherein the translation means includes a tracking mirror (54) for reflecting the received light signal and a controller (56) for controlling movement of the tracking mirror.*

*43. A method for the high-speed, high-resolution, 3-D imaging of an object at a vision station to develop dimensional information associated with the object including scanning a beam of controlled light in a scanning direction at the surface of the object in a manner to create a reflected beam of light; spacial filtering the reflected beam of light; delivering the reflected beam of light to a position sensitive detector having a position-sensing direction and an area sufficiently small to keep the capacitance down so the speed is up; and using said position sensitive detector with an anamorphic lens system for providing an elongated line of light across a discrete extended region which is elongated orthogonally to the position sensitive direction of the detector, whereby to achieve the high-speed and high-resolution.*

*44. The method of claim 43 wherein the position sensitive detector is a photodiode.*

* * * * *

UNITED STATES PATENT AND TRADEMARK OFFICE

CERTIFICATE OF CORRECTION

PATENT NO. : Re 36,560
DATED : February 8, 2000
INVENTOR(S) : Donald J. Svetkoff et al.

It is certified that error appears in the above-identified patent and that said Letters Patent is hereby corrected as shown below:

Column 14,
Line 34, delete "31" and insert -- 33 --.

Signed and Sealed this

Twenty-sixth Day of November, 2002

*Attest:*

*Attesting Officer*

JAMES E. ROGAN
*Director of the United States Patent and Trademark Office*